United States Patent
Nabetani (10) Patent No.: US 8,171,365 B2
(45) Date of Patent: May 1, 2012

(54) COMMUNICATION APPARATUS AND METHOD THEREOF

(75) Inventor: Toshihisa Nabetani, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 518 days.

(21) Appl. No.: 12/472,482

(22) Filed: May 27, 2009

(65) Prior Publication Data

US 2009/0319852 A1 Dec. 24, 2009

(30) Foreign Application Priority Data

Jun. 19, 2008 (JP) ................ P2008-160523

(51) Int. Cl.
*H04L 1/16* (2006.01)
(52) U.S. Cl. ........................................ 714/748
(58) Field of Classification Search .................... 714/748
See application file for complete search history.

(56) References Cited

U.S. PATENT DOCUMENTS

| | | | |
|---|---|---|---|
| 5,555,266 A * | 9/1996 | Buchholz et al. | 370/347 |
| 6,600,737 B1 * | 7/2003 | Lai et al. | 370/352 |
| 6,697,331 B1 * | 2/2004 | Riihinen et al. | 370/236 |
| 7,068,606 B1 * | 6/2006 | Ma et al. | 370/236 |
| 7,352,702 B2 * | 4/2008 | Rosier | 370/236 |
| 7,440,399 B2 * | 10/2008 | Julian et al. | 370/230 |
| 7,577,145 B2 * | 8/2009 | Maruyama et al. | 370/392 |
| 7,898,962 B2 * | 3/2011 | Hiddink et al. | 370/236 |

OTHER PUBLICATIONS

IEEE. Standard for Wireless Laws, IEEE Std 802.11e-2005. pp. 96-100.

* cited by examiner

*Primary Examiner* — Stephen Baker
(74) *Attorney, Agent, or Firm* — Turocy & Watson, LLP

(57) ABSTRACT

This is disclosed a communication apparatus. A receiving unit receives plural data frames which are transmitted from other communication apparatus. An error detection unit checks whether each data frame is received correctly or incorrectly. A determination unit estimates a first overhead and a second overhead and determines whether or not to send a block acknowledgement frame by comparing the first and the second overheads. The determination unit estimates the first overhead being caused by sending the block acknowledgement frame and the second overhead being caused by not sending the block acknowledgement frame. The receiving unit receives the data frames which are retransmitted from the other communication apparatus after a certain period of time has passed without sending the block acknowledgement frame, the data frames retransmitted from the other communication apparatus including both data frames which are correctly received and incorrectly received.

19 Claims, 10 Drawing Sheets

| TRANSMISSION RATE (Mbps) / Size | 1500BYTE | 1000BYTE | 500BYTE | 160BYTE |
|---|---|---|---|---|
| 216 | 97.504 | 100.604 | 106.070 | 116.757 |
| 270 | 99.096 | 101.711 | 108.949 | 122.876 |
| 324 | 100.613 | 104.155 | 111.203 | 122.876 |
| 405 | 101.679 | 106.070 | 112.442 | 126.897 |
| 486 | 104.065 | 107.958 | 114.833 | 122.876 |
| 540 | 105.507 | 108.425 | 115.423 | 126.897 |

FIG.4B

| TRANSMISSION RATE (Mbps) \ size | 1500BYTE | 1000BYTE | 500BYTE | 160BYTE |
|---|---|---|---|---|
| 216 | 89.280 | 92.555 | 99.681 | 114.595 |
| 270 | 91.139 | 94.866 | 104.280 | 120.261 |
| 324 | 92.434 | 97.507 | 106.224 | 120.261 |
| 405 | 94.964 | 99.681 | 108.756 | 124.138 |
| 486 | 97.561 | 102.422 | 111.005 | 120.261 |
| 540 | 98.551 | 104.029 | 111.443 | 124.138 |

FIG.4C

| TRANSMISSION RATE (Mbps) \ size | 1500BYTE | 1000BYTE | 500BYTE | 160BYTE |
|---|---|---|---|---|
| 216 | 81.057 | 92.555 | 94.569 | 110.270 |
| 270 | 83.183 | 94.866 | 98.054 | 117.647 |
| 324 | 85.072 | 97.507 | 101.245 | 117.647 |
| 405 | 87.290 | 99.681 | 103.226 | 121.379 |
| 486 | 91.057 | 102.422 | 107.177 | 120.261 |
| 540 | 92.754 | 104.029 | 107.463 | 124.138 |

COMMUNICATION APPARATUS AND METHOD THEREOF

CROSSREFERENCE TO RELATED APPLICATIONS

This application is based upon and claims the benefit of priority from the prior Japanese Patent Application No. 2008-160523, filed on Jun. 19, 2008, the entire contents of which are incorporated herein by reference.

BACKGROUND OF THE INVENTION

1. Field of the Invention

The present invention relates to a communication apparatus and method thereof.

2. Description of the Related Art

An ARQ (Automatic Repeat reQuest) has been used to improve communication quality in wireless communications. In the ARQ, when a receiving node receives a data frame correctly, the receiving node sends an ACK (ACKnowledgement) frame back to a transmitting node. On the other hand, when the receiving node receives a data frame incorrectly, the receiving node does not send the ACK frame. When the transmitting node has not received the ACK frame for a certain period, it retransmits the data frame.

One of the retransmission methods is a selective repeat ARQ. In the selective repeat ARQ, after the receiving node receives plural data frames from the transmitting node, the receiving node sends a BA (Block ACK) frame including a bitmap field to the transmitting node. The bitmap field includes a plurality of acknowledgment bits corresponding to the plural data frames. Each acknowledgment bit in the bitmap field indicates whether the corresponding data frame is correct or incorrect. When the acknowledgment bit is "1", it means that the corresponding data frame is correct. On the other hand, when the acknowledgment bit is "0", it means that the corresponding data frame is incorrect. The receiving node could not send back the BA frame, for example, when all data frames are incorrect. Actually, this depends on a communication system and implemented algorithm for the selective repeat ARQ. When the transmitting node receives the BA frame, it checks the acknowledgement bits of the bitmap field in the BA frame and retransmits the corresponding data frame when the corresponding acknowledgement bit is indicating as incorrect.

The selective repeat ARQ improves throughput performances, because it decreases an overhead by transmitting only one BA frame for plural data frames received instead of transmitting a plurality of ACK frames for plural data frames as in the ARQ.

The selective repeat ARQ is adopted in IEEE802.11e, which is one of the standards of wireless LAN, as disclosed in "Wireless LAN Medium Access Control (MAC) and Physical Layer (PHY) specifications, Medium Access Control (MAC) Quality of Service (QoS) Enhancements," IEEE Std. 802.11e-2005". The selective repeat ARQ is called as Block ACK Mechanism in IEEE802.11e.

Figure 6:
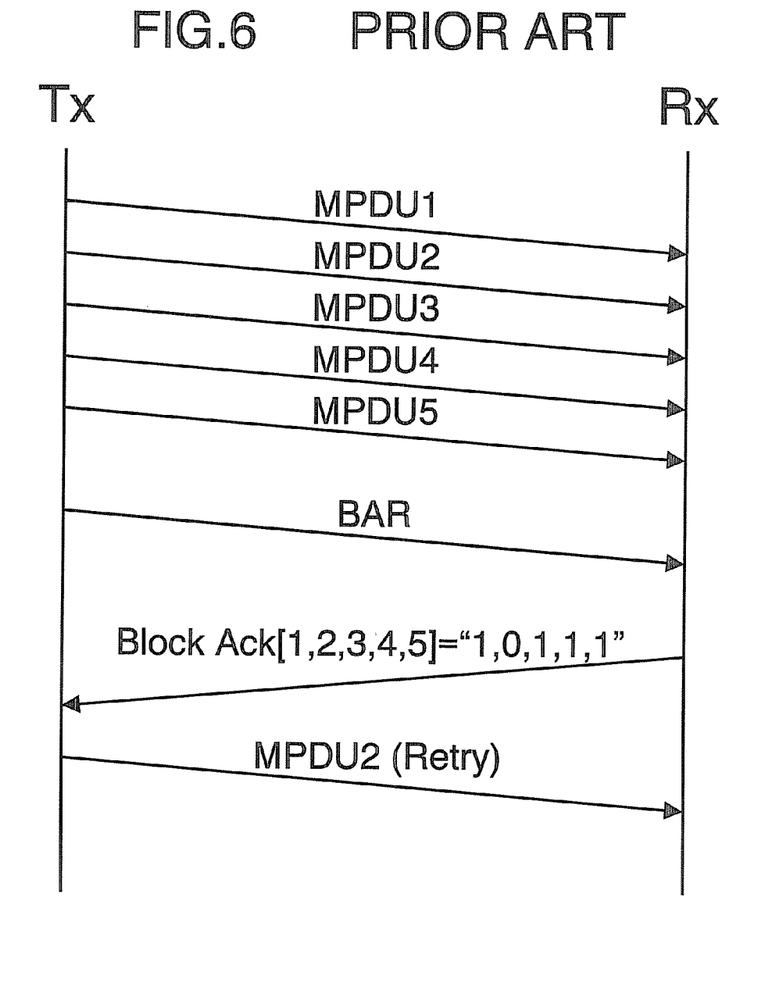
FIG. 6 is a frame sequence chart showing an example of the Block ACK Mechanism in IEEE802.11e.

Hereinafter, a data frame is called as a MPDU (MAC Protocol Data Unit) as IEEE802.11e. As shown in FIG. 6, in the Block ACK Mechanism, a transmitting node Tx transmits plural MPDUs (five MPDU1-5 in FIG. 6) and a BAR (Block ACK Request) frame sequentially. The BAR frame is a control frame which requests a receiving node Rx to send back a BA frame. When the receiving node Rx receives the BAR frame, it sends back a BA frame to the transmitting node Tx. The BA frame is same as that in the selective repeat ARQ described above. In FIG. 6, the receiving node Rx fails to receive a MPDU2 with a sequence number of "2". Therefore, the receiving node Rx sends back the BA frame with a bitmap field indicating that the MPDU2 is incorrect and the MPDU1, 3-5 are correct. The transmitting node Tx receives the BA frame and checks the bitmap field in the BA frame, then retransmits the MPDU2, since the corresponding acknowledgement bit is indicating as incorrect.

Recently, IEEE802.11n adopts the Block ACK Mechanism.

IEEE802.11n also adopts a frame aggregation method to decreases more overheads. In the frame aggregation method, plural MPDUs are aggregated into a PHY frame called as an A-MPDU (Aggregated-MPDU).

Figure 7:
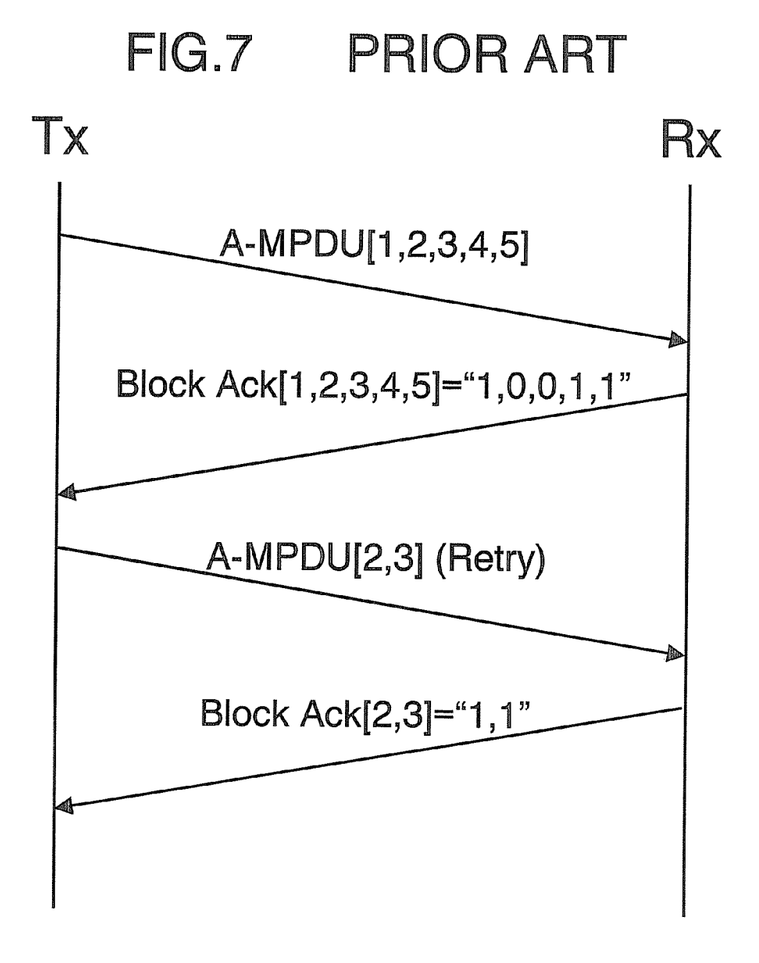
FIG. 7 is a frame sequence chart showing an example of the Block ACK Mechanism in IEEE802.11n.

As shown in FIG. 7, the transmitting node Tx transmits an A-MPDU including plural MPDU1-5. The receiving node Rx receives the A-MPDU and sends back a BA frame including a bitmap field to indicate that the MPDU2,3 are incorrect and the MPDU1,4-5 are correct.

Then, the transmitting node Tx receives the BA frame and checks the bitmap field in the BA frame, then retransmits an A-MPDU including MPDU2,3, since the corresponding acknowledgement bits are indicating as incorrect. If the receiving node Rx succeeds in receiving the MPDU2,3 in the retransmitted A-MPDU, it sends back a BA frame including a bitmap field to indicate that both MPDU2,3 are correct.

In IEEE802.11n, the receiving node Rx sends back a BA frame without receiving a BAR frame from the transmitting node Tx.

In the frame aggregation method, each MPDU includes a destination node address field. The destination node address fields of all MPDUs in the A-MPDU are set to a node address of the receiving node Rx. When at least one MPDU in the A-MPDU is received correctly, the receiving node Rx checks a destination node address of the MPDU received correctly. If the destination node address corresponds to the node address of the receiving node Rx, the receiving node Rx sends back a BA frame. If the destination node address does not correspond to the node address of the receiving node Rx, the receiving node Rx does not send back a BA frame.

Moreover, when all MPDUs in the A-MPDU are received incorrectly, the receiving node Rx does not send back a BA frame, since the receiving node Rx does not obtain the destination node address in the each MPDU and does not determine whether the A-MPDU is send to the own node, or to another node.

When the transmitting node Tx has not received a BA frame for a certain period (25 usec) since it had transmitted an A-MPDU, it regards as failing to transmit all MPDUs in the A-MPDU. Therefore, the transmitting node Tx retransmits the A-MPDU.

Under the environment with higher PER (Packet Error Rate), the receiving node Rx fails to receive more MPDUs. In the conventional Block ACK Mechanism described above, even if only one MPDU in the A-MPDU is received correctly, the receiving node Rx has to send back a BA frame.

In IEEE802.11n, BA frame is transmitted with a low transmission rate such as 24 Mbps. This transmission rate is selected from Basic Rate Set of IEEE802.11 for backward compatibility.

On the other hand, data frames such as A-MPDU and MPDU are transmitted with a high transmission rate of maximum 600 Mbps by using MIMO (Multi Input Multi Output) and extended channel bandwidth.

Because the difference of the transmission rate between data frame and BA frame is widen, it takes longer time to transmit a BA frame compared with a data frame. Therefore, the overhead due to transmission of BA frame increases relative to data frame.

As described above, the transmission of BA frame leads to increase overhead and causes a degradation of throughput performances in the Block ACK Mechanism, especially, under the environment with high PER. Moreover, this problem would be more severe with increasing the transmission rate of data frame in future.

SUMMARY OF THE INVENTION

According to one aspect of the invention, a communication apparatus for receiving a plurality of data frames from an other communication apparatus and for sending back a block acknowledgement frame including a plurality of information, each indicating whether the corresponding data frame is correctly received or incorrectly received, includes:

a receiving unit which receives the data frames which are transmitted from the other communication apparatus;

an error detection unit which checks whether each data frame is received correctly or incorrectly; and a determination unit which estimates a first overhead and a second overhead and which determines whether or not to send the block acknowledgement frame by comparing the first and the second overheads;

wherein the determination unit estimates the first overhead being caused by sending the block acknowledgement frame and the second overhead being caused by not sending the block acknowledgement frame; and the receiving unit receives the data frames which are retransmitted from the other communication apparatus after a certain period of time has passed without sending the block acknowledgement frame, the data frames retransmitted from the other communication apparatus including both data frames which are correctly received and incorrectly received.

DETAILED DESCRIPTION OF THE INVENTION

The embodiments will be explained with reference to the accompanying drawings.

(Description of the First Embodiment)

The first embodiment will explain a radio communication apparatus "A" (Rx) which receives an A-MPDU from another radio communication apparatus "B" (Tx). The radio communication apparatuses "A" (Rx), "B" (Tx) are based on a standard of IEEE802.11n for wireless LAN in the first embodiment.

However, the radio communication apparatuses "A" (Rx), "B" (Tx) could be based on other standards of other wireless communication networks.

The radio communication apparatus "A" (Rx) determines whether it sends a BA frame or not according to overhead due to transmission of a BA frame.

In the first embodiment, the overhead is total time [μsec] taken to be received all MPDUs in the A-MPDU correctly at the radio communication apparatus "A" (Rx), except the time taken to transmit MPDUs which have not received correctly. In other word, the overhead includes a vacant time which is not used to transmit such as SIFS (Short Inter Frame Space), a time to transmit a BA frame and a time to retransmit a redundant MPDU which has already received correctly.

Hereinafter, we describe the procedures to receive an A-MPDU at the radio communication apparatus "A" (Rx) by using FIG. 1 and FIG. 2. As shown in FIG. 2, the procedures have nine steps S101-S109.

Figure 1:
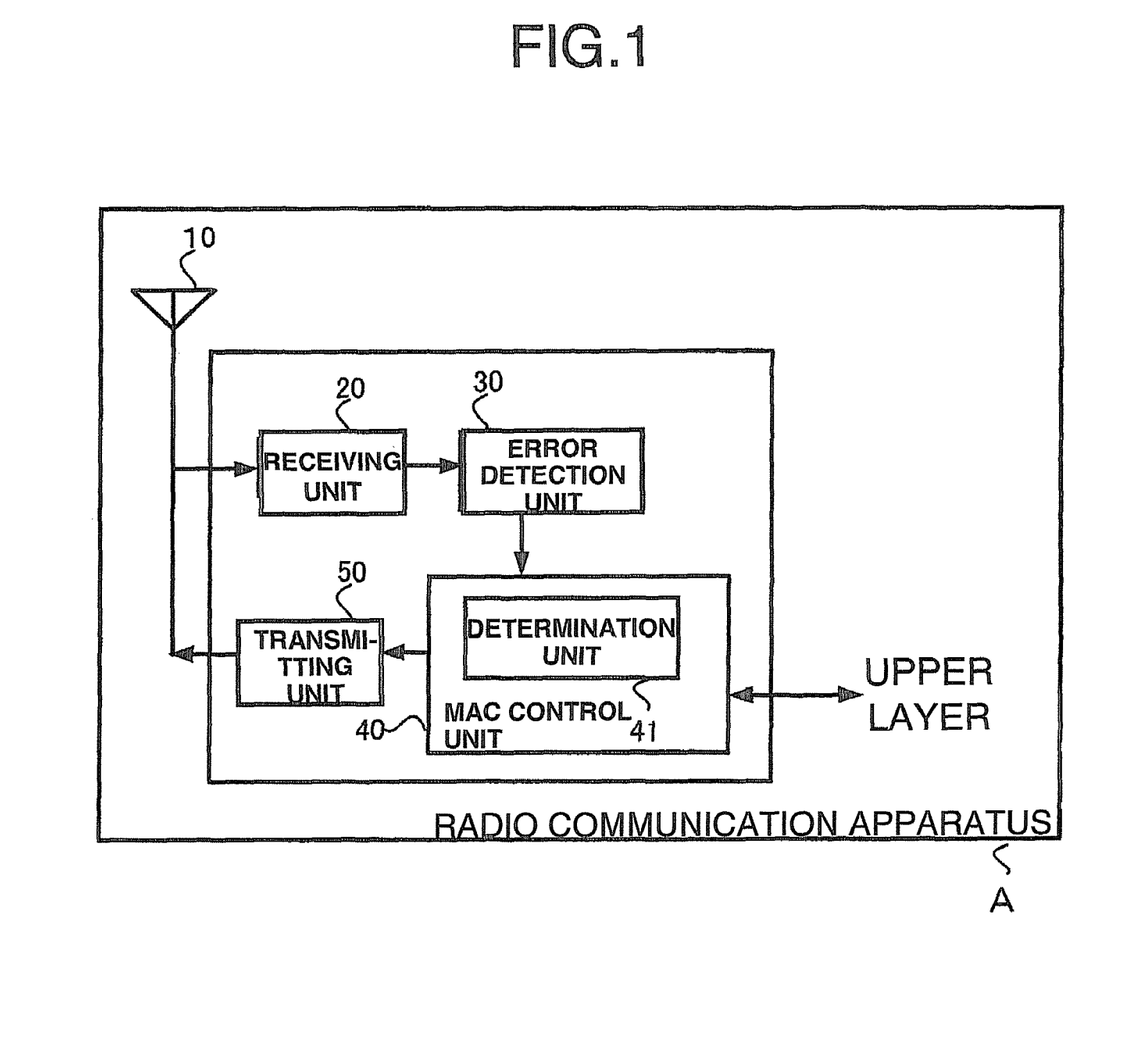
FIG. 1 is a block diagram showing a radio communication apparatus "A" according to the first embodiment.
Figure 2:
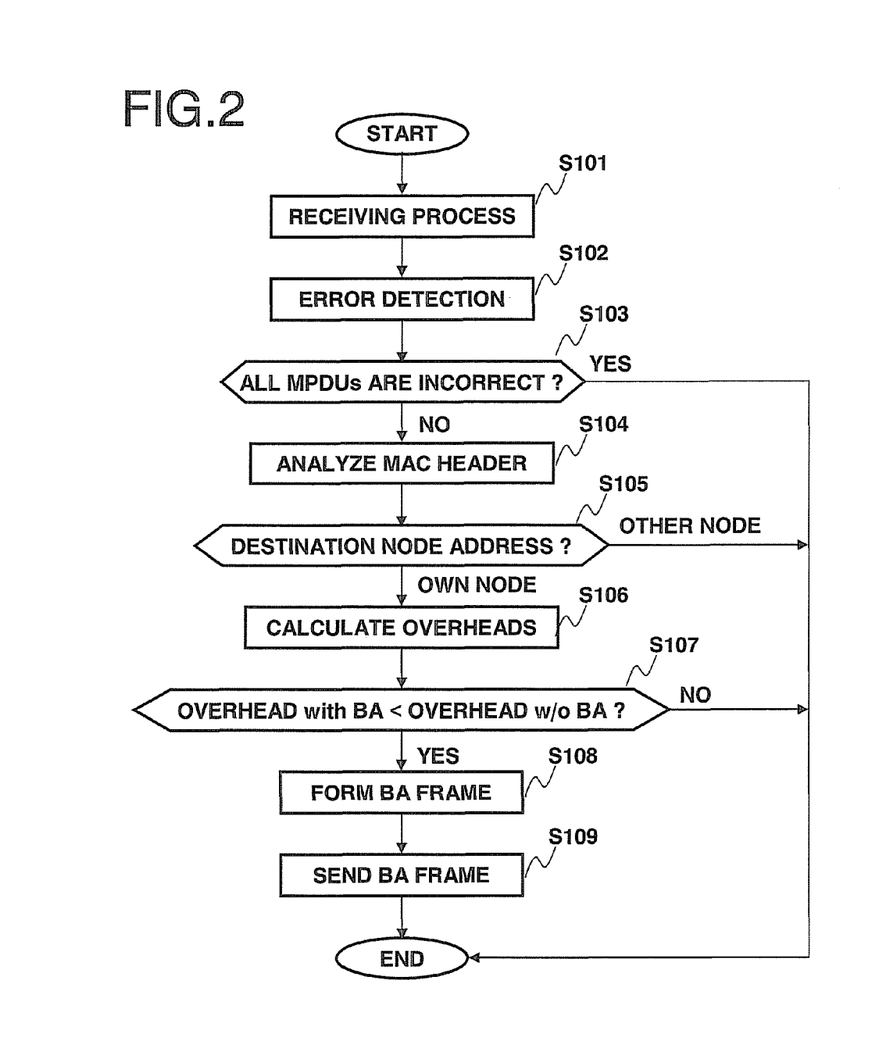
FIG. 2 is a flowchart explaining behavior of the radio communication apparatus "A"

As shown in FIG. 1, the radio communication apparatus "A" (Rx) includes an antenna 10, a receiving unit 20, an error detection unit 30, a MAC control unit 40, and a transmitting unit 50. The MAC control unit 40 has a determination unit 41 to determine whether the radio communication apparatus "A" (Rx) sends a BA frame or not according to overhead due to transmission of a BA frame.

First, the antenna 10 receives a radio signal from the radio communication apparatus "B" (Tx).

In the step S101 of FIG. 2, the receiving unit 20 performs an A/D (Analog to Digital) conversion and decodes the radio signal to obtain an A-MPDU. Moreover, the receiving unit 20 de-aggregates the A-MPDU to plural MPDUs.

Next, in the step S102 of FIG. 2, the error detection unit 30 checks whether there is an error in each MPDU or not. If the error detection unit 30 does not detect error in the MPDU, it regards the MPDU as being correct. On the other hand, if the error detection unit 30 detects error in the MPDU, it regards the MPDU as being incorrect. When the MPDU is correct, the error detection unit 30 outputs the MPDU and output information indicating correct to the MAC control unit 40. On the other hand, when the MPDU is incorrect, the error detection unit 30 discards the incorrect MPDU and output information indicating incorrect to the MAC control unit 40. Since the MAC control unit 40 could recognize that the input MPDU is correct even without the information indicating correct or incorrect by being input only correct MPDU from the error detection unit 30. The error detection unit 30 outputs correct MPDU and may not output information indicating correct or incorrect to the MAC control unit 40. Moreover, the error detection unit 30 may be used for calculating PER (Packet Error Rate) described later.

Each MPDU may include CRC (Cyclic Redundancy Check) code. The error detection unit 30 detects error in each MPDU by checking the CRC code. Another method could be used to detect error at the error detection unit 30. Also, each MPDU includes MAC header and payload. The MAC header includes destination node address and traffic type such as video, voice, file, and so on. The node is a radio communication apparatus included in the wireless communication network. In the first embodiment, the radio communication apparatuses "A" (Rx), "B" (Tx) are nodes.

When the error detection unit 30 detects error in all MPDUs in the A-MPDU, the error detection unit 30 discards all MPDUs. Then, the radio communication apparatus "A" (Rx) finishes the receiving processes (in the case of "Yes" of the step S103). This means the determination unit 41 has skipped the steps S106, S107. In this case, the radio communication apparatus "A" (Rx) does not send a BA frame to the radio communication apparatus "B" (Tx).

When the error detection unit 30 does not detect error in at least one MPDU in the A-MPDU (in the case of "No" in the step S103), that is when the error detection unit 30 outputs at least one MPDU to the MAC control unit 40, the MAC control unit 40 analyzes MAC header in the MPDU in the step S104. Then, the MAC control unit 40 checks the destination node address in the MAC header whether it corresponds to the own node or to another node in the step S105.

When the destination node address does not correspond to the own node (in the case of "No" of the step S105), the MPDU is discarded without storing in a receiving buffer (not shown). Then, the radio communication apparatus "A" (Rx) finishes the receiving processes. This means the determination unit 41 has skipped the steps S106, S107. In this case, the radio communication apparatus "A" (Rx) does not send a BA frame to the radio communication apparatus "B" (Tx).

On the other hand, when the destination node address corresponds to the own node (in the case of "Yes" of the step S105), the MPDU is stored in the receiving buffer (not shown) in the MAC control unit 40. Then, the MAC control unit 40 outputs the MPDU to an upper layer according to a parameter such as traffic type in the MAC header.

Simultaneously, the determination unit 41 in the MAC control unit 40 determines whether the radio communication apparatus "A" (Rx) sends a BA frame or not to the radio communication apparatus "B" (Tx) through the processes in the steps S106, S107. According to above processes, the determination unit 41 operates and the steps S106, S107 are performed when there is at least one MPDU, which is correct and the destination node address corresponds to the own node, in the A-MPDU.

In the step S106, the determination unit 41 calculates the amount of overhead caused by sending a BA frame (hereinafter, referred to as "overhead with BA") and the amount of overhead caused by not sending a BA frame (hereinafter, referred to as "overhead without BA"). Then, the determination unit 41 compares these amounts of overheads with and without BA. The detail of the step S106 is described later.

The overheads with BA and without BA may be calculated every receiving A-MPDU in the determination unit 41. Otherwise, the overheads with BA and without BA may be calculated preliminarily and stored in a memory (not shown). In the latter case, the determination unit 41 only refers to the memory when receiving A-MPDU.

Otherwise, the memory may stores information indicating which overhead is larger, the overhead with BA or the overhead without BA, instead of storing the values of the overhead with BA and the overhead without BA. In this case, the determination unit 41 only reads the information indicating which overhead is larger from the memory when receiving A-MPDU.

When the overhead with BA is smaller than the overhead without BA (in the case of "Yes" of the step S107), the determination unit 41 determines to send a BA frame to the radio communication apparatus "B" (Tx). The reason is that MAC efficiency will be improved by sending a BA frame rather than by not sending a BA frame. The MAC efficiency is a use efficiency of a wireless channel. In general, the MAC efficiency becomes higher with reducing overheads.

Then, the MAC control unit 40 generates a BA frame (in the step S108). The BA frame includes a bitmap which is same as IEEE802.11n. The BA frame is modulated in the transmitting unit 50 and send back to the radio communication apparatus "B" (Tx) from the antenna 10 (in the step S109).

The BA frame is send after a lapse of SIFS (Short Inter Frame Space: 16 μsec) since the radio communication apparatus "A" (Rx) received the A-MPDU.

On the other hand, when the overhead with BA is larger than or equal to the overhead without BA (in the case of "No" of the step S107), the determination unit 41 determines not to send a BA frame to the radio communication apparatus "B" (Tx). The reason is that MAC efficiency will be improved by not sending BA frame rather than by sending a BA frame.

Then, the radio communication apparatus "A" (Rx) finishes the receiving processes. In this case, the radio communication apparatus "A" (Rx) does not send back a BA frame to the radio communication apparatus "B" (Tx), even if there is at least one MPDU, which is correct and the destination node address corresponds to the own node, in the A-MPDU.

Moreover, when the radio communication apparatus "A" (Rx) does not send a BA frame, the radio communication apparatus "B" (Tx) will not receive a BA frame for a certain period (25 usec) since it transmitted the A-MPDU. Therefore, it regards as failing to transmit all MPDUs in the A-MPDU, and retransmits the A-MPDU to the radio communication apparatus "A" (Rx).

This means that all MPDUs in the A-MPDU are retransmitted even if some MPDUs in the A-MPDU are correct, whenever the determination unit 41 determines not to send a BA frame.

When the radio communication apparatus "A" receives a MPDU which has already received correctly, it may discard the MPDU.

In the first embodiment, while the procedures to receive an A-MPDU based on IEEE802.11n have been described above, these procedures could be applied for receiving plural MPDUs sequentially like the burst transmission in IEEE802.11e.

In the case of burst transmission in IEEE802.11e, the determination unit 41 may use a receiving a BAR frame as a trigger to operate the determination whether the radio communication apparatus "A" (Rx) sends a BA frame or not to the radio communication apparatus "B" (Tx).

Figure 3A:
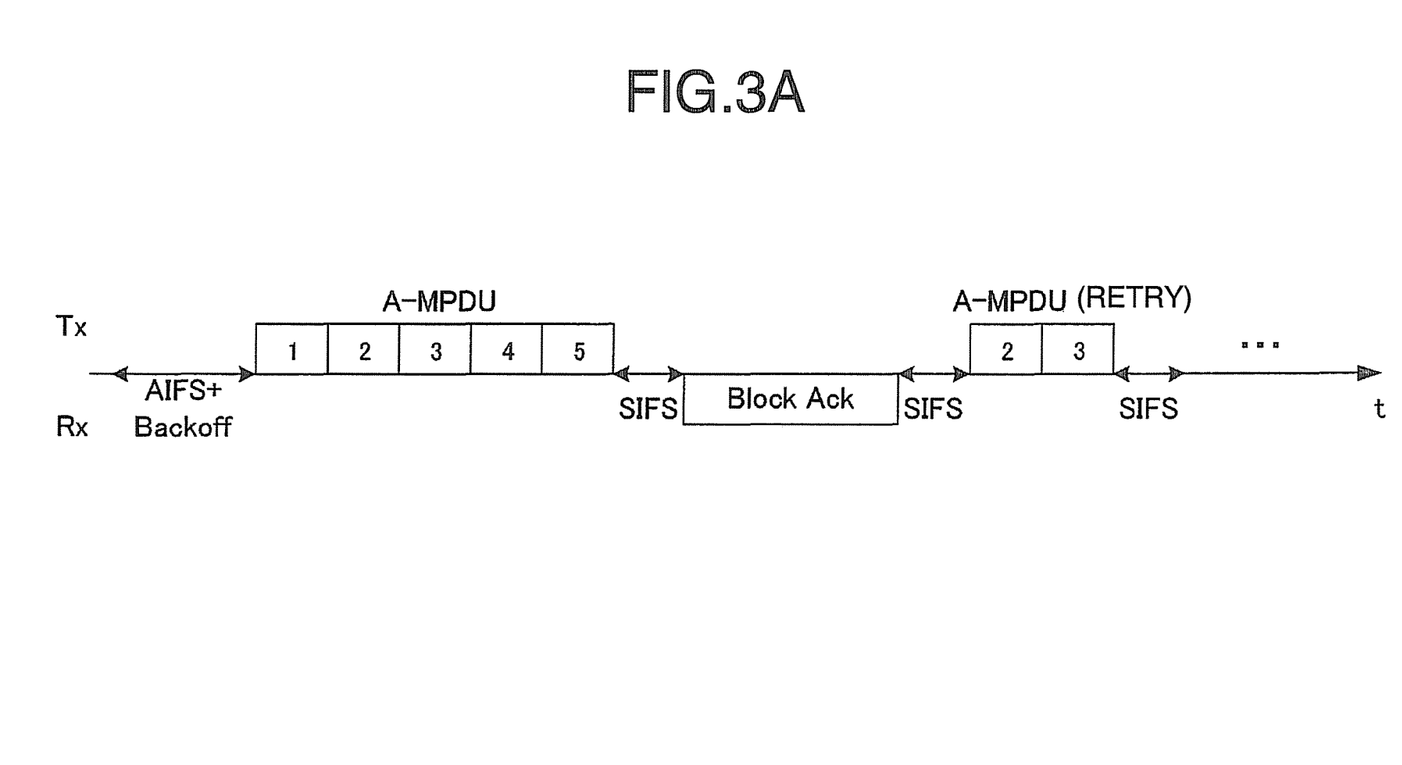
FIG. 3A shows an example of frame exchanges when a BA frame is transmitted.
Figure 3B:
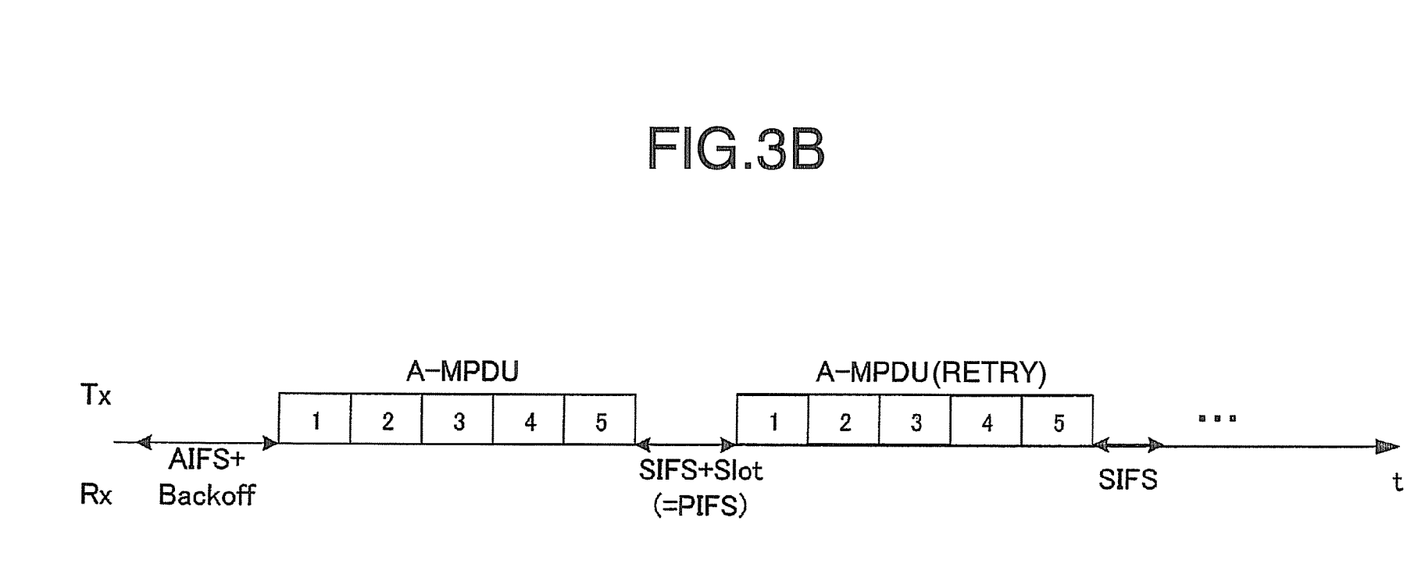
FIG. 3B shows an example of frame exchanges when a BA frame is not transmitted.

Next, an example of the overheads with BA and without BA is explained by using FIGS. 3A,3B.

In FIGS. 3A,3B, the radio communication apparatus "B" (Tx) transmits an A-MPDU including five MPDU1-5 as a first transmission to the radio communication apparatus "A" (Rx). The radio communication apparatus "A" (Rx) receives MPDU1,4,5 correctly, and MPDU2,3 incorrectly.

In FIG. 3A, the radio communication apparatus "A" (Rx) sends a BA frame to the radio communication apparatus "B" (Tx). Then, the radio communication apparatus "B" (Tx) retransmits an A-MPDU including two MPDU2,3 as a retransmission.

The overhead with BA [μsec] is expressed as (SIFS+TxBA_TIME+SIFS) according to FIG. 3A. SIFS is a fixed time of 16 [μsec] according to IEEE802.11n. TxBA_TIME is a time [μsec] taken to transmit a BA frame. TxBA_TIME is calculated by using size [Byte] of the BA frame and transmission rate [Mbps] of the BA frame.

Since the size [Byte] of a BA frame is defined in the specification of IEEE802.11n, if the transmission rate [Mbps] of a BA frame is fixed, TxBA_TIME [µsec] is also fixed. As a result, the overhead with BA is fixed. In this case, the determination unit 41 may not calculate the overhead with BA every receiving A-MPDU by storing the value of fixed overhead with BA in a memory.

On the other hand, in FIG. 3B, the radio communication apparatus "A" (Rx) does not send a BA frame. Because the radio communication apparatus "B" (Tx) have not received a BA frame for (SIFS+A_SLOT_TIME) since it transmitted the A-MPDU, it regards as failing to transmit all MPDU1-5 in the A-MPDU. Therefore, the radio communication apparatus "B" (Tx) retransmits the A-MPDU including MPDU1-5 as a retransmission. However, since MPDU1,4,5 have received correctly in the first transmission, the MPDU1,4,5 in the retransmission are redundant.

The overhead without BA [µsec] is expressed as (SIFS+A_ASLOT_TIME+TxDATA_TIME) according to FIG. 3B. SIFS is a fixed time of 16 [µsec] and A_SLOT_TIME is a fixed time of 9 [µsec] according to IEEE802.11n.

TxDATA_TIME is a time [µsec] taken to transmit MPDU1, 4,5 which have already received correctly in the first transmission. TxDATA_TIME is calculated by using total size [Byte] of MPDU1,4,5 and transmission rate [Mbps] for retransmission of A-MPDU.

The radio communication apparatus "B" (Tx) may use lower transmission rate for the retransmission than that used for the first transmission. Since the transmission rates for the first transmission and for the retransmission are different, the transmission rate for the retransmission is adopted to calculate the TxDATA_TIME.

According to the equation described above, the overhead without BA gets smaller with increasing the transmission rate for the retransmission of A-MPDU and shrinking the size of each MPDU.

Relatively, the overhead with BA gets larger. Therefore, the determination unit 41 tends to determine not to send a BA frame when transmission rate of A-MPDU is higher and the size of each MPDU is smaller.

Moreover, the determination unit 41 also tends to determine not to send a BA frame when PER is high. The PER may be obtained from the error detection unit 30. Since most MPDU1-5 could actually be incorrect under the environment with high PER, even if all MPDU1-5 are retransmitted because of sending no BA frame, most of these MPDU1-5 are not redundant.

Hereinafter, a modified example of the first embodiment will be described. The modified example uses the MAC efficiency to determine whether the radio communication apparatus "A" (Rx) sends a BA frame or not in the determination unit 41.

Figure 4A:
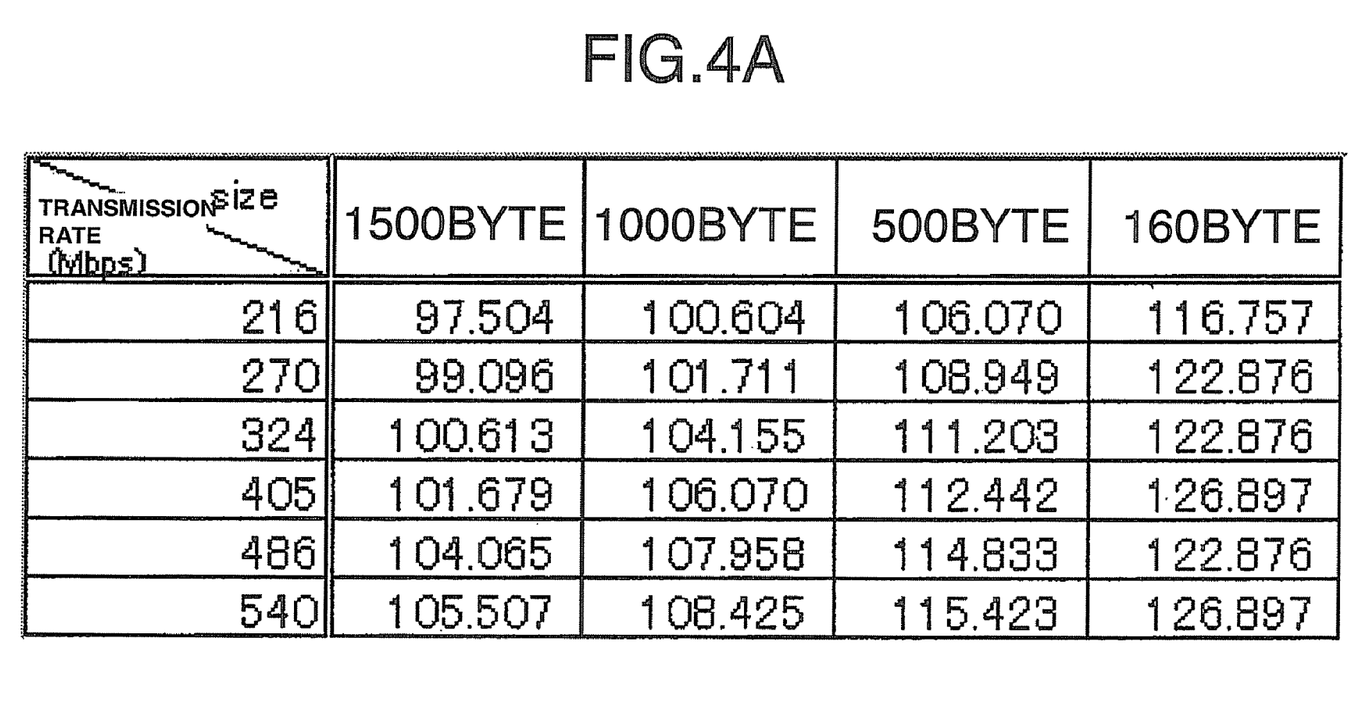
FIG. 4A shows results of comparison between overhead with BA and without BA when the number of incorrect MPDUs in an A-MPDU is "4"
Figure 4B:
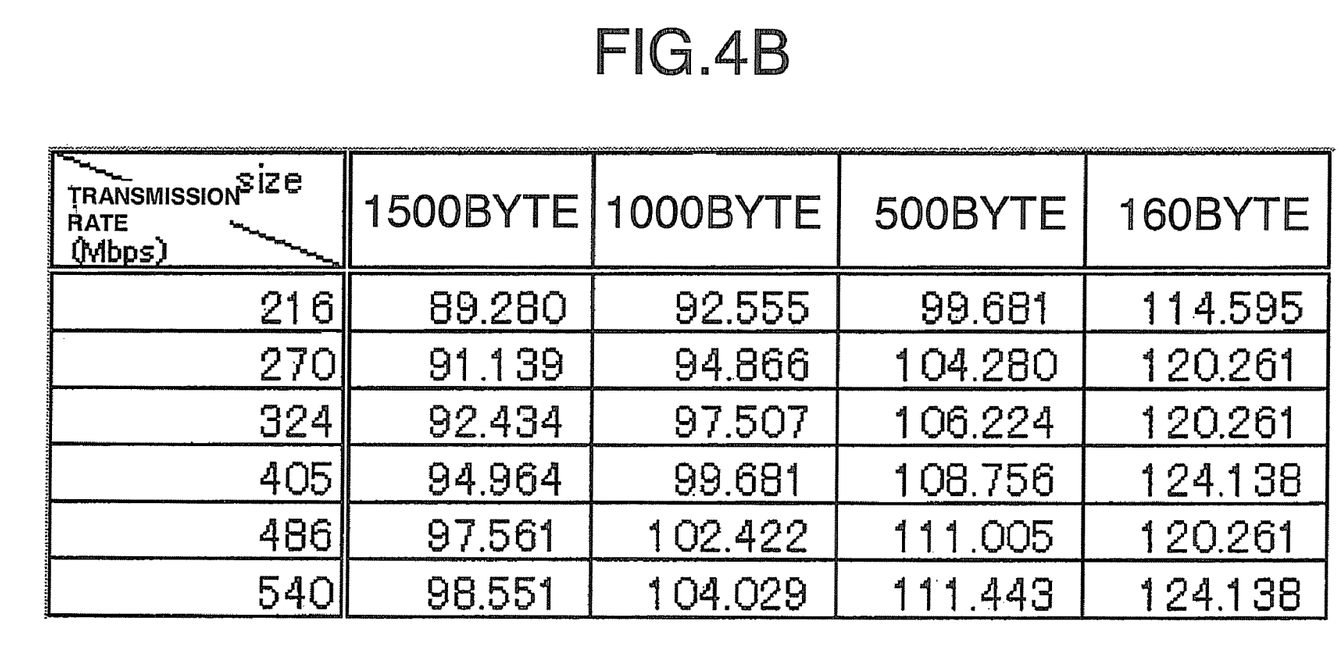
FIG. 4B shows results of comparison between overhead with BA and without BA when the number of incorrect MPDUs in an A-MPDU is "3"
Figure 4C:
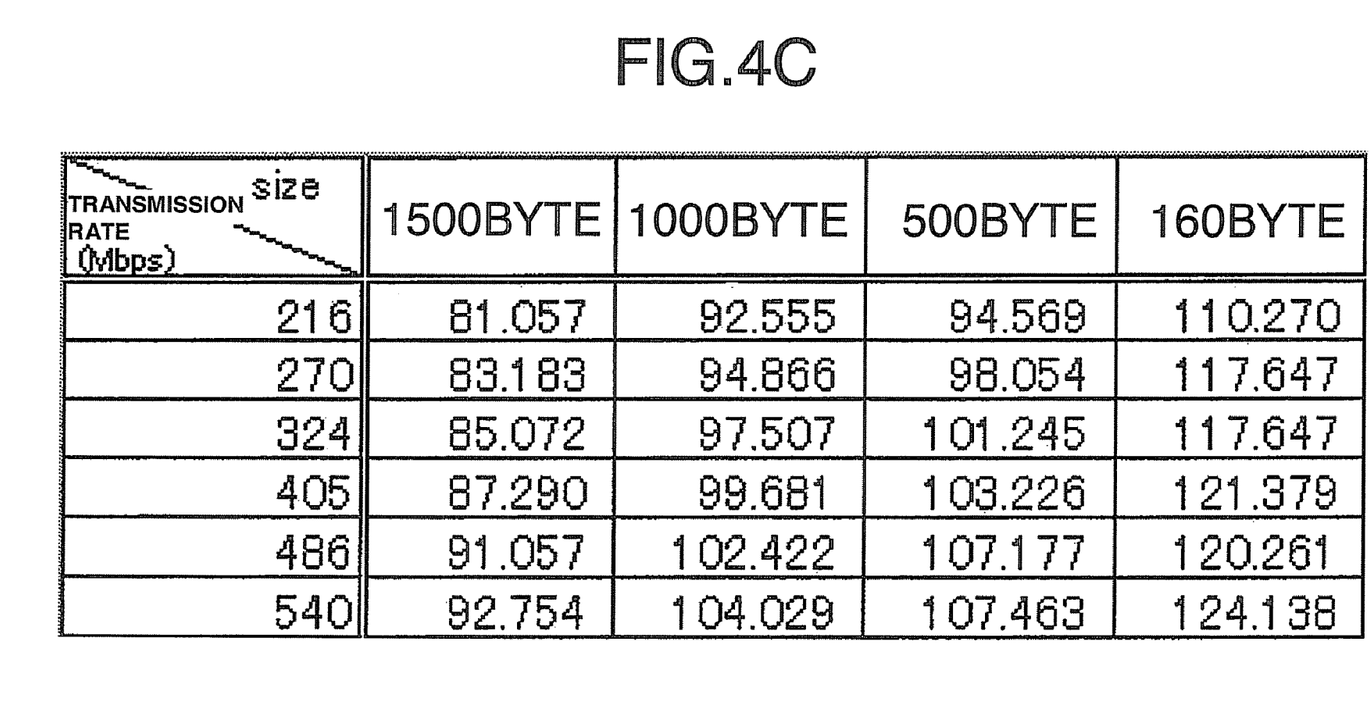
FIG. 4C shows results of comparison between overhead with BA and without BA when the number of incorrect MPDUs in an A-MPDU is "2"

The MAC efficiency is expressed as (Throughput [Mbps]/Transmission rate of A-MPDU [Mbps]). The MAC efficiency is calculated in the determination unit 41. The throughput is also calculated in the determination unit 41 based on the size of each MPDU from the error detection unit 30. Otherwise, MAC efficiencies may be calculated preliminarily in related to transmission rate of A-MPDU and size of each MPDU, and stored in the memory (not shown). As an example, FIGS. 4A-4C show ratio [%] of the MAC efficiency in the case of sending no BA frame against the MAC efficiency in the case of sending a BA frame. FIGS. 4A-4C are the cases which two to four MPDUs are incorrect in an A-MPDU including five MPDUs, respectively. Since the MAC efficiency depends on the transmission rate of A-MPDU and the size of each MPDU as described above, the ratio in FIGS. 4A-4C are shown in related to the transmission rate of A-MPDU in row and the size of each MPDU in column. The size of each MPDU may be anyone of 1500, 1000, 500, 160 [Byte]. The transmission rate of A-MPDU may be anyone of 216, 270, 324, 405, 486, 540 [Mbps] according to IEEE802.11n. Moreover, the ratios in FIGS. 4A-4C are calculated using the MAC efficiencies which are under the environment with error free (PER is "0").

The ratio of over 100[%] means that the MAC efficiency without BA is higher than that with BA.

Therefore, the determination unit 41 determines not to send a BA frame. When the ratio of over 100[%], larger ratio means that sending no BA frame improves the MAC efficiency more compared with sending a BA frame.

According to the first embodiment, the radio communication apparatus "A" achieves higher MAC efficiency by not sending a BA frame, when the overhead without BA is smaller than the overhead with BA. As a result, the radio communication apparatus "A" improves throughput performances.

While the determination unit 41 in the first embodiment determines whether the radio communication apparatus "A" sends a BA frame or not based on the overhead every time, it may sometimes determine to send a BA frame regardless the overhead, for example, when sending no BA frame are continued several times.

The reason is that the size of A-MPDU has not changed during the retransmission based on no BA frame, since all MPDUs in the A-MPDU are retransmitted. However, in a wireless channel, a rearward MPDU in the A-MPDU has higher PER than a frontal MPDU because of the channel fluctuation.

Considering this high PER at the rearward MPDU, it would be better to reduce the number of MPDUs in the A-MPDU. To reduce the number of MPDUs in the A-MPDU, sending a BA frame is useful. Because when the radio communication apparatus "B" (Tx) receives a BA frame, it retransmits only incorrect MPDUs. Therefore, the number of MPDUs in the A-MPDU decreases every retransmission.

As a result, the degradation of the MAC efficiency due to the high PER at the rearward MPDU can be reduced by sending a BA frame regardless the overhead when sending no BA frame are continued several times.

The radio communication apparatus "A" in the first embodiment could be achieved as a radio communication program which makes a computer execute a prescribed procedure. The communication program is stored in a program storage device in the computer. The storage device includes, for example, a non-volatile semiconductor storage device and a magnetic disk device. The communication program is read into a random access memory (RAM) by control from a CPU (not shown) and executed by the CPU.

(Description of the Second Embodiment)

Figure 5:
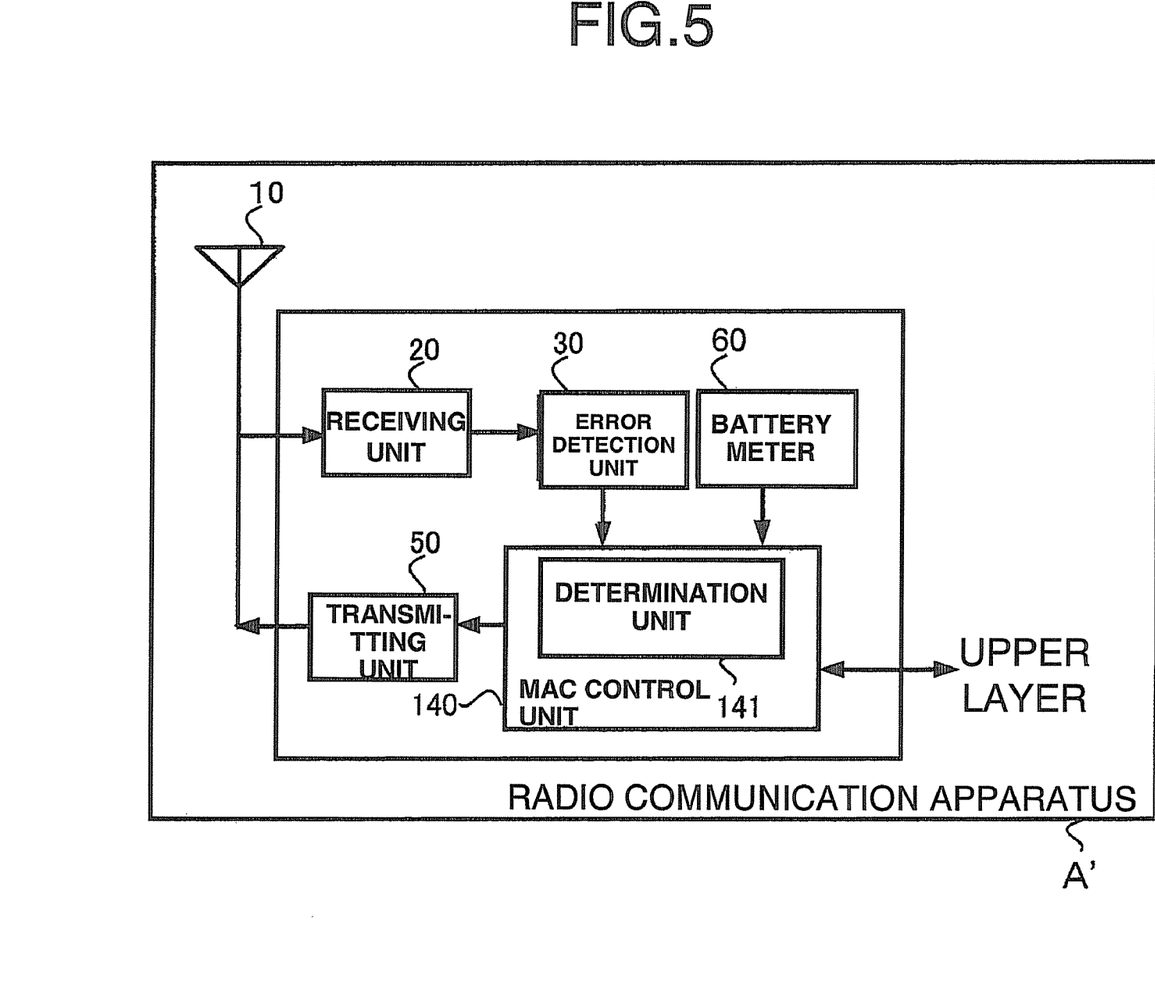
FIG. 5 is a block diagram showing a radio communication apparatus "A" according to the second embodiment.

The second embodiment will explain a radio communication apparatus "A'" (Rx) which receives an A-MPDU from another radio communication apparatus "B" (Tx). The radio communication apparatus "A'" (Rx) determines whether it sends a BA frame or not according to remaining battery power As shown in FIG. 5, the radio communication apparatus "A'" (Rx) includes an antenna 10, a receiving unit 20, an error detection unit 30, a battery meter 60, a MAC control unit 140, and a transmitting unit 50. Components except the battery meter 60 and the MAC control unit 140 are same as them in the first embodiment. Therefore, we will skip explanations of these components. Moreover, the MAC control unit 140 has a determination unit 141 to determine whether the radio communication apparatus "A'" (Rx) sends a BA frame or not by a method described below, which is different from the first embodiment.

The battery meter 60 measures the remaining battery power of the radio communication apparatus "A'" (Rx) periodically or whenever the determination unit 141 tries to determine whether the radio communication apparatus "A" (Rx) sends a BA frame or not. Then, the battery meter 60 outputs the remaining battery power to the determination unit 141.

Hereinafter, we describe the method to determine whether the radio communication apparatus "A" (Rx) sends a BA frame or not at the determination unit 141. The determination unit 141 tends to determine not to send a BA frame when the remaining battery power is lower and a wireless channel condition is bad.

First, the determination unit 141 sets a threshold used for the determination. The threshold is adapted according to the remaining battery power from the battery meter 60. For example, the threshold is small value when the remaining battery power is low, and the threshold is large value when the remaining battery power is high. The threshold is expressed as $\alpha^*A$. "A" is a fixed value, for example, "4" when the number of incorrect MPDUs is adopted, or, for example, "0.5" when the PER is adopted. "$\alpha$" is variable coefficient ($0 \leq \alpha \leq 1$) which is determined according to the remaining battery power from the battery meter 60. "$\alpha$" is smaller when the remaining battery power is lower. Therefore, the threshold "$\alpha^*A$" is also smaller, when the remaining battery power is lower.

The determination unit 141 compares the number of incorrect MPDUs in the received A-MPDU with the threshold $\alpha^*A$. The number of incorrect MPDUs is obtained from the error detection unit 30. The determination unit 141 may use PER of received MPDUs instead of the number of incorrect MPDUs. The PER may be obtained from the error detection unit 30.

For example, in the case of FIG. 3, the number of the incorrect MPDUs is "2" and the PER is "0.4(=2/5)".

When the number of incorrect MPDUs (or the PER) is smaller than the threshold $\alpha^*A$, the determination unit 41 determines to send a BA frame. It means that it sends a BA frame when the wireless channel condition is good. Moreover, since the threshold $\alpha^*A$ is depending upon the remaining battery power, for example, the threshold $\alpha^*A$ is large value when the remaining battery power is high, it tends to send a BA frame when the remaining battery power is high.

On the other hand, when the number of incorrect MPDUs (or the PER) is larger than the threshold $\alpha^*A$, the determination unit 41 determines not to send a BA frame. It means that it does not send a BA frame when the wireless channel condition is bad. Moreover, since the threshold $\alpha^*A$ is depending upon the remaining battery power, for example, the threshold $\alpha^*A$ is small value when the remaining battery power is low, it tends not to send a BA frame when the remaining battery power is low.

In the bad wireless channel condition, since most MPDUs in the A-MPDU may actually be incorrect, even if all MPDUs in the A-MPDU are retransmitted because of sending no BA frame, most of these MPDUs are not redundant. Therefore, sending no BA frame does not degrade MAC efficiency.

Moreover, the determination unit 141 tends to determine not to send a BA frame when the remaining battery power is lower, since the threshold $\alpha^*A$ is smaller and depending upon the remaining battery power.

According to the second embodiment, the radio communication apparatus "A'" decreases the consumption power of the battery by not sending a BA frame when the remaining battery power is low. Especially by not sending a BA frame when the wireless channel condition is bad, the radio communication apparatus "A'" does not degrade MAC efficiency. As a result, the radio communication apparatus "A'" increases a life of the battery without degradation of the MAC efficiency.

During performing the second embodiment, when some special cases are happen, the determination unit 141 may skips comparison between the number of incorrect MPDUs (or the PER) and the threshold $\alpha^*A$. Three example cases are described below. The determination unit 141 may determine to send a BA frame without the comparison between the number of incorrect MPDUs (or the PER) and the threshold $\alpha^*A$ in order to avoid the degradation of MAC efficiency, when the MAC efficiency would extremely be degraded by sending no BA frame.

Also, the determination unit 141 may determine to send a BA frame without the comparison between the number of incorrect MPDUs (or the PER) and the threshold $\alpha^*A$ in order to reduce the degradation of the MAC efficiency, when sending no BA frame are continued several times as described in the first embodiment.

Also, the determination unit 141 may determine to send a BA frame without the comparison between the number of incorrect MPDUs (or the PER) and the threshold $\alpha^*A$ in order to decrease processing load, when the remaining battery power is high.

Hereinafter, a modified example of the second embodiment will be described. The determination unit 141 may compares the threshold $\alpha^*A$ with the overhead without BA instead of the number of incorrect MPDUs or PER. The overhead without BA is same as the first embodiment.

The determination unit 141 determines not to send a BA frame, when the overhead without BA is smaller than the threshold $\alpha^*A$.

On the other hand, the determination unit 141 determines to send a BA frame, when the overhead without BA is larger than the threshold $\alpha^*A$.

The MAC efficiency may be improved by sending no BA frame when the overhead without BA is small.

Moreover, the determination unit 141 may compares the threshold $\alpha^*A$ with a difference of the overheads with BA and without BA, when the overhead without BA is larger than the overhead with BA. When the difference is larger than the threshold $\alpha^*A$, the determination unit 141 determines to send a BA frame.

On the other hand, when the difference is smaller than the threshold $\alpha^*A$, the determination unit 141 determines not to send a BA frame. In the case of the small difference, the overhead without BA is almost same as the overhead with BA, and the MAC efficiency is not degrade by sending no BA frame. In addition to that, the consumption power of the battery is low by sending no BA frame. As a result, the radio communication apparatus "A'" increases a life of the battery without degradation of the MAC efficiency.

The first and second embodiments may be combined. The determination unit 141 may perform two comparison processes using the overheads with BA and without BA in the first embodiment (hereinafter, referred to as "overhead comparison") and using the threshold with a coefficient, the coefficient depending upon the remaining battery power in the second embodiment (hereinafter, referred to as "battery power comparison").

First, the determination unit 141 performs the battery power comparison. Therefore, it compares the number of incorrect MPDUs (or the PER) with the threshold with a coefficient, the coefficient depending upon the remaining battery power.

Then, when the number of incorrect MPDUs (or the PER) is smaller than the threshold with a coefficient, the determination unit 141 furthermore performs the overhead comparison. Therefore, it compares the overheads with BA and without BA. If the overhead with BA is smaller than the overhead without BA, the determination unit 141 determines to send a BA frame. Otherwise, the determination unit 141 determines not to send a BA frame.

This decreases processing load of the determination unit 141, since the determination unit 141 performs calculations of the overheads for the overhead comparison only when the number of incorrect MPDUs (or the PER) is smaller than the threshold with a coefficient.

Moreover, another combination of the first and second embodiments is considered.

First, the determination unit 141 performs the overhead comparison. Then, when the overhead without BA is smaller than the overhead with BA, the determination unit 141 furthermore performs the battery power comparison.

If the number of incorrect MPDUs (or the PER) is larger than the threshold with a coefficient, the coefficient depending upon the remaining battery power, the determination unit 141 determines not to send a BA frame. Otherwise, the determination unit 141 determines to send a BA frame. This achieves low consumption power of the battery without the degradation of the MAC efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus for receiving a plurality of data frames from an other communication apparatus and for sending back a block acknowledgement frame including a plurality of information, each indicating whether the corresponding data frame is correctly received or incorrectly received, comprising:
    a receiving unit which receives the data frames which are transmitted from the other communication apparatus;
    an error detection unit which checks whether each data frame is received correctly or incorrectly; and
    a determination unit which estimates a first overhead and a second overhead and which determines whether or not to send the block acknowledgement frame by comparing the first and the second overheads;
    wherein
the determination unit estimates the first overhead being caused by sending the block acknowledgement frame and the second overhead being caused by not sending the block acknowledgement frame; and
    the receiving unit receives the data frames which are retransmitted from the other communication apparatus after a certain period of time has passed without sending the block acknowledgement frame, the data frames retransmitted from the other communication apparatus including both data frames which are correctly received and incorrectly received.

2. The communication apparatus of claim 1, wherein
the determination unit determines to send the block acknowledgement frame if the first overhead is smaller than the second overhead.

3. The communication apparatus of claim 1, wherein
the determination unit determines not to send the block acknowledgement frame if the first overhead is larger than or equal to the second overhead.

4. The communication apparatus of claim 1, wherein
the first overhead includes a time to transmit the block acknowledgement frame in the case of sending the block acknowledgement frame, and
the second overhead includes a time to retransmit a data frame which has already received correctly in the case of sending no block acknowledgement frame.

5. The communication apparatus of claim 1, wherein
the determination unit determines to send the block acknowledgement frame
after sending no block acknowledgement frame to a same communication apparatus among the other communication apparatus are continued several times.

6. A communication apparatus for receiving a plurality of data frames from an other communication apparatus and for sending back a block acknowledgement frame including a plurality of information, each indicating whether the corresponding data frame is correctly received or incorrectly received, comprising:
    a receiving unit which receives the data frames which are transmitted from the other communication apparatus;
    an error detection unit which checks whether each data frame is received correctly or incorrectly and detects a number of incorrect data frames or a PER (Packet Error Rate) from the data frames received;
    a determination unit which determines whether or not to send the block acknowledgement frame by comparing a threshold and either number of the incorrect data frames or the PER; and
    a battery meter which measures remaining battery power;
    wherein
    the determination unit determines the threshold based on the remaining battery power; and
    the receiving unit receives the data frames which are retransmitted from the other communication apparatus after a certain period of time has passed without sending the block acknowledgement frame, the data frames retransmitted from the other communication apparatus including both data frames which are correctly received and incorrectly received.

7. The communication apparatus of claim 6, wherein
the determination unit determines not to send the block acknowledgement frame if either the number of the incorrect data frames or the PER is larger than the threshold which gets smaller with decreasing the remaining battery power.

8. The communication apparatus of claim 6, wherein
the determination unit determines to send the block acknowledgement frame if either the number of the incorrect data frames or the PER is smaller than the threshold which gets smaller with decreasing the remaining battery power.

9. The communication apparatus of claim 6, wherein
the determination unit determines to send the block acknowledgement frame if either the number of the incorrect data frames or the PER is smaller than the threshold which gets smaller with decreasing the remaining battery power and the first overhead is smaller than the second overhead.

10. The communication apparatus of claim 6, wherein
the determination unit determines not to send the block acknowledgement frame if either the number of the incorrect data frames or the PER is smaller than the threshold which gets smaller with decreasing the remaining battery power and the first overhead is larger than or equal to the second overhead.

11. The communication apparatus of claim 6, wherein
the determination unit determines not to send the block acknowledgement frame if the first overhead is smaller than the second overhead and the difference between the first overhead and the second overhead is smaller than the threshold which gets larger with decreasing the remaining battery power.

12. The communication apparatus of claim 6, wherein
the determination unit determines to send the block acknowledgement frame if the first overhead is smaller than the second overhead and the difference between the first overhead and the second overhead is larger than the threshold which gets larger with decreasing the remaining battery power.

13. The communication apparatus of claim 6, wherein
the determination unit determines not to send the block acknowledgement frame if the second overhead is smaller than the threshold which gets smaller with decreasing the remaining battery power.

14. The communication apparatus of claim 6, wherein
the determination unit determines to send the block acknowledgement frame if the second overhead is larger than the threshold which gets smaller with decreasing the remaining battery power.

15. The communication apparatus of claim 6, wherein
the determination unit determines to send the block acknowledgement frame
after sending no block acknowledgement frame to a same communication apparatus among the other communication apparatus are continued several times.

16. A communication method for receiving a plurality of data frames from an other communication apparatus and for sending back a block acknowledgement frame including a plurality of information, each indicating whether the corresponding data frame is correctly received or incorrectly received, comprising:
receiving the data frames which are transmitted from the other communication apparatus;
checking whether each data frame is received correctly or incorrectly;
estimating a first overhead being caused by sending the block acknowledgement frame and a second overhead being caused by not sending the block acknowledgement frame;
determining whether or not to send the block acknowledgement frame by comparing the first and the second overheads; and
receiving the data frames which are retransmitted from the other communication apparatus after a certain period of time has passed without sending the block acknowledgement frame, the data frames retransmitted from the other communication apparatus including both data frames which are correctly received and incorrectly received.

17. A communication method for receiving a plurality of data frames from an other communication apparatus and for sending back a block acknowledgement frame including a plurality of information, each indicating whether the corresponding data frame is correctly received or incorrectly received, comprising:
receiving the data frames which are transmitted from the other communication apparatus;
checking whether each data frame is received correctly or incorrectly;
detecting a number of incorrect data frames or PER from the data frames received;
measuring remaining battery power;
determining whether or not to send the block acknowledgement frame by comparing a threshold and either the number of incorrect data frames or the PER, the threshold being based on the remaining battery power; and
receiving the data frames which are retransmitted from the other communication apparatus after a certain period of time has passed without sending the block acknowledgement frame, the data frames retransmitted from the other communication apparatus including both data frames which are correctly received and incorrectly received.

18. A computer readable storage medium storing instructions of a computer program for receiving a plurality of data frames from an other communication apparatus and for sending back a block acknowledgement frame including a plurality of information, each indicating whether the corresponding data frame is correctly received or incorrectly received, the computer program which when executed by a computer results in performance of steps comprising:
a program module for instructing a computer to receive the data frames which are transmitted from the other communication apparatus;
a program module for instructing the computer to check whether each data frame is received correctly or incorrectly;
a program module for instructing the computer to estimate a first overhead being caused by sending the block acknowledgement frame and a second overhead being caused by not sending the block acknowledgement frame;
a program module for instructing the computer to determine whether or not to send the block acknowledgement frame by comparing the first and the second overheads; and
a program module for instructing the computer to receive the data frames which are retransmitted from the other communication apparatus after a certain period of time has passed without sending the block acknowledgement frame, the data frames retransmitted from the other communication apparatus including both data frames which are correctly received and incorrectly received.

19. A computer readable storage medium storing instructions of a computer program for receiving a plurality of data frames from an other communication apparatus and for sending back a block acknowledgement frame including a plurality of information, each indicating whether the corresponding data frame is correctly received or incorrectly received, the computer program which when executed by a computer results in performance of steps comprising:
a program module for instructing a computer to receive the data frames which are transmitted from the other communication apparatus;
a program module for instructing the computer to check whether each data frame is received correctly or incorrectly;
a program module for instructing the computer to detect a number of incorrect data frames or PER from the data frames received;
a program module for instructing the computer to measure remaining battery power;

a program module for instructing the computer to determine whether or not to send the block acknowledgement frame by comparing a threshold and either the number of incorrect data frames or the PER, the threshold being based on the remaining battery power; and a program module for instructing the computer to receive the data frames which are retransmitted from the other communication apparatus after a certain period of time has passed without sending the block acknowledgement frame, the data frames retransmitted from the other communication apparatus including both data frames which are correctly received and incorrectly received.

* * * * *